Dec. 16, 1969 F. H. LASKOW Re. 26,742

GIFT WRAPPING

Original Filed Feb. 4, 1966

INVENTOR.
FREDERICK H. LASKOW

BY Percy Freeman

ATTORNEY

United States Patent Office

Re. 26,742
Reissued Dec. 23, 1969

26,742
GIFT WRAPPING

Frederick H. Laskow, La Salle County, Ill.
(801 Chambers St., Ottawa, Ill. 61350)

Original No. 3,381,889, dated May 7, 1968, Ser. No. 525,252, Feb. 4, 1966. Application for reissue Sept. 9, 1968, Ser. No. 793,200
Int. Cl. B65d *65/12, 5/22, 5/12*
U.S. Cl. 229—87 3 Claims

Matter enclosed in heavy brackets [ ] appears in the original patent but forms no part of this reissue specification; matter printed in italics indicates the additions made by reissue.

*ABSTRACT OF THE DISCLOSURE*

This disclosure relates to gift wrappings for boxes which wrappings are flat prior to use and which are entirely complete in and of themselves, requiring no additional materials such as tieing or separate adhesive means.

This invention relates generally to wrappings for boxes, and is especially concerned with a unique gift wrapping for a box.

It is an important object of the present invention to provide a gift wrapping for a box which is extremely simple in construction, requiring only a single sheet of wrapping paper or other material, which can be quickly and easily applied by persons without special skill or training, and which is neat and highly attractive in appearance.

It is still another object of the present invention to provide a gift wrapping having the advantageous characteristics mentioned in the preceding paragraph, which is essentially flat prior to use for economy of space in storage and transit, and which is entirely complete in itself, requiring no additional materials, such as tying or separate adhesive means.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
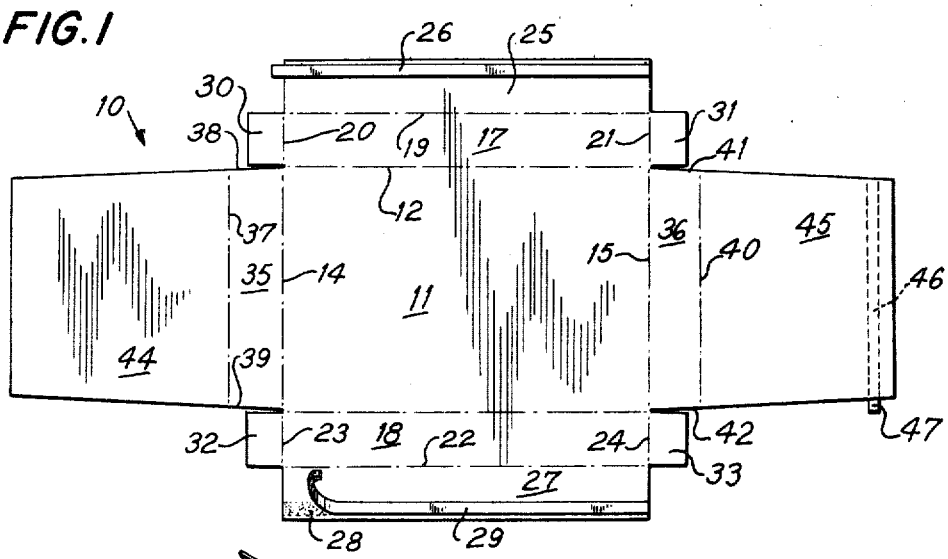
FIGURE 1 is a plan view showing a gift wrapping of the present invention prior to use.

Referring now more particularly to the drawings, and specifically to FIGURE 1 thereof, the wrapping of the present invention is there generally designated 10, and configured for application to a rectangular hexahedral container or box. The wrapping 10 may advantageously be fabricated of any suitable flexible sheet material, such as paper, or the like, and may be integrally formed of a single sheet of such material, as by die-cutting. In addition, the wrapping 10 may be pre-scored, if desired, and is so illustrated, to facilitate the applying procedure.

In particular, the wrapping 10 includes a main part 11, which is of generally rectangular-outline configuration being bounded by side folds 12 and 13 extending in substantially parallelism with each other, and end folds 14 and 15 extending parallel to each other and normal to the side folds, between the ends thereof. The size and shape of the main part 11 is configured to conformably cover the front or face of a box, being generally congruent thereto, as will appear more fully hereinafter.

Extending from the side folds 12 and 13 of the main part 11 are respective side panels 17 and 18, each being of generally rectangular configuration and longitudinally coextensive with its adjacent side of the main part. The side panel 17 is bounded between the side fold 12 and a parallel fold 19 spaced outward from the fold 12, and a pair of end folds 20 and 21 each extending between an adjacent pair of ends of the folds 12 and 19, substantially normal thereto. The side panel 17 is longitudinally coextensive with the main part 11, so that the end folds 20 and 21 are respectively aligned with end folds 14 and 15 of the main part.

Similarly, the side panel 18 is bounded within the side fold 13 and an outer side fold 22 parallel to the fold 13, and a pair of generally parallel end folds 23 and 24 in respective alignment with the end folds 14 and 15 of the main part 11. The size and shape of side panels 17 and 18 are configured for congruent covering relation with the sides of a box, as will appear presently.

A generally rectangular securement flap 25 extends from the outer side fold 19 of side panel 17, being longitudinally coextensive therewith. The rectangular securement flap 25 is advantageously provided with pressure-sensitive adhesive on one face thereof, extending longitudinally therealong, which adhesive may be protectively covered by a removable strip 26. The side panel 18 is similarly provided with a generally rectangular securement flap 27 extending from the outer side fold 22 and longitudinally coextensive with the side panel 18. Also, the securement flap 27 may be provided on one surface thereof with a longitudinally extending zone of pressure-sensitive adhesive 28 protectively covered by a removable strip 29.

Extending from opposite ends of the side panel 17, as from respective end folds 20 and 21 are a pair of generally rectangular end tabs 30 and 31, each coextensive with its connecting fold. Similarly, a pair of end tabs 32 and 33 extend from opposite ends of side panel 18, being respectively connected to end folds 23 and 24, and coextensive therewith.

A pair of generally rectangular end panels 35 and 36 extend from opposite ends of the main part 11, being respectively connected thereto by end folds 14 and 15. The end panel 35 is generally rectangular, being bounded within the end fold 14, and an outer fold 37, parallel to and spaced outward from the end fold 14. In addition, a pair of end edges 38 and 39 extend, respectively, between adjacent ends of the folds 14 and 37. The end panel 35 may be substantially rectangular, and slightly trapezoidal, if desired, with the edges 38 and 39 being somewhat convergent in the outward direction.

Similarly, the end panel 36 may be bounded within the fold 15 and an outer fold 40 generally parallel to and outward of the fold 15, and a pair of edges 41 and 42 each extending between an adjacent pair of ends of the folds 14 and 15. The end panel 36 may be substantially rectangular, being coextensive with the fold 15, or may be slightly trapezoidal with the edges 41 and 42 somewhat convergent in the outward direction.

Extending from the fold 37 of end panel 35 may be a cover flap 44, coextensive with the connecting fold 37, and of substantially rectangular or slightly outwardly tapering, trapezoidal configuration. Similarly, a cover flap 45 may extend outward from the end panel 36, being connected thereto by fold 40 and coextensive therewith. The cover flap 45 may also be substantially rectangular, or of slightly trapezoidal configuration tapering in the outward direction. On one surface of the cover flap 45, extending laterally thereacross, may be a zone of pressure-sensitive adhesive, as at 46, which may be protectively covered by a removable backing strip 47.

As viewed in FIGURE 1, the wrapping 10 is seen from its inner side, the adhesive on securement flaps 25 and 27 being provided on the inner sides thereof, while the adhesive 46 on the cover flap 45 being provided on the outer side thereof. If desired, a simulated tying means or ribbon may be carried on the outer side of the wrapping 10, as will appear presently.

Figure 2:
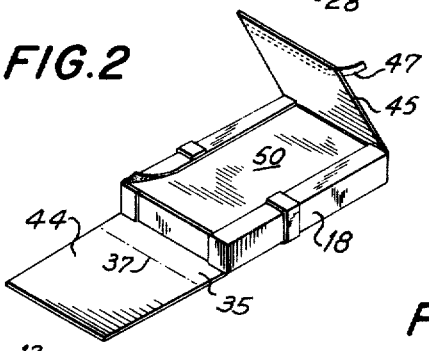
FIGURE 2 is a perspective view illustrating an intermediate stage in applying the gift wrapping of FIGURE 1 to a box.
Figure 3:
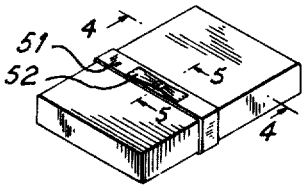
FIGURE 3 is a perspective view showing the gift wrapping of the present invention in its fully applied condition.
Figure 4:
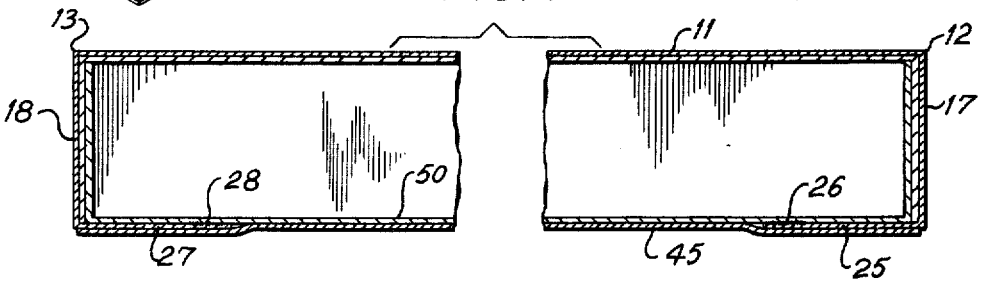
FIGURE 4 is a sectional view taken generally along the line 4—4 of FIGURE 3, enlarged for clarity and broken away to conserve space.

In the wrapping operation, best seen in FIGURES 2 and 4, a generally rectangular, hexahedral box 50 is placed on the wrapping 10, resting conformably on and substantially congruently covering the main part 11. The front or top of the box 50 is arranged in facing engagement with the inner or upper surface of the main part 11. The side panels 17 and 18 may then be folded upward about their respective folds 12 and 13 into congruent covering engagement with respective sides of the box 50. With the removable adhesive-protecting strips 26 and 29 removed, the securement flaps 25 and 27 may be swung inward into overlying engagement with the upwardly facing bottom or back of the box 50, and applied thereto for adhesive securement of the flaps to the box back. The tabs 30, 31, 32 and 33 may then be swung inward about their respective folds 20, 21, 23 and 24, each into overlying engagement with the adjacent box end-wall portion.

The end panel 36 may next be swung about its adjacent fold 15 into covering engagement with the adjacent box end wall, overlying the tabs 31 and 33, and the cover flap 45 may then be swung about fold 40 into covering engagement with the box back. The removable strip 47 may then be removed to expose the pressure-sensitive adhesive 46.

Finally, the end panel 35 may be swung about fold 14 into covering engagement with its adjacent box end, and the cover flap 44 swung about fold 37 to overlie the adjacent portion of the box back, and engage with the exposed adhesive 46 of flap 45. By this means, the cover flaps 44 and 45 are effectively secured in covering relation with respect to the back of box 50.

Figure 5:
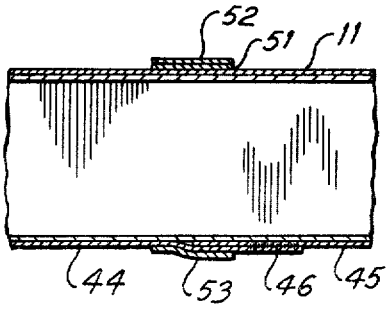
FIGURE 5 is a partial sectional view taken generally along the line 5—5 of FIGURE 3, somewhat enlarged.

If desired, there may be provided on the outer side of main part 11 (the underside as seen in FIGURE 1) a strip of ribbon 51 suitably secured to the main part and extending across the side panels 17 and 18, and securement flaps 25 and 27. The ribbon strip 51 may be provided with a decorative bow 52. An additional length of ribbon may be applied to the undersurface of flap 44, as viewed in FIGURE 1, to provide an apparent continuation of the ribbon strip 51, as at 53 in FIGURE 5. In this manner, the ribbon strips 51 and 53 combine, together with the bow 52, to simulate a tying member circumscribing the package.

From the foregoing, it is seen that the present invention provides a gift wrapping for a box, which wrapping fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. In combination, a generally rectangular hexahedral box, and a gift wrapping for enclosing said box, said wrapping being fabricated of an integral sheet of flexible material and comprising a generally rectangular main part adapted to conformably cover the front of said box, a pair of generally rectangular side panels extending from opposite sides of said main part for covering engagement with the sides of the box, a securement flap on each side panel for securement to the back of the box, a pair of generally rectangular end panels extending from opposite ends of said main part for covering engagement with the ends of the box, a pair of cover flaps extending from each end panel for covering engagement with the adjacent portion of the box back and overlying engagement with each other, and adhesive means for securing said cover flaps in said overlapping engagement, end tabs on opposite ends of said side panels for covering engagement with the adjacent end portions of the box end walls beneath said end panels, said side panels being coextensive with the sides of said main part, said end panels being coextensive with the ends of said main part, and said cover flaps being coextensive with said end panels and combining to substantially completely cover box back, and a simulated tie means secured exteriorly on said main part.

*2. In combination, a generally rectangular hexahedral box, and a gift wrapping for enclosing said box, said wrapping being fabricated of an integral sheet of flexible material and comprising a generally rectangular main part adapted to conformably cover the front of said box, a pair of generally rectangular side panels extending from opposite ends of said main part for covering engagement with the sides of the box, a pair of generally rectangular end panels extending from opposite ends of said main part for covering engagement with the ends of the box, each of said side and end panels having a flap extending from one edge thereof for covering engagement with the box back, an opposite pair of said flaps extending for overlying engagement with each other, adhesive means for securing said flaps in overlapping engagement, end tabs on said panels for covering engagement with the adjacent portions of the box walls beneath said panels, said side panels being coextensive with the sides of said main part, said end panels being coextensive with the ends of said main part, and said overlapping flaps being coextensive with said panels and combining to substantially cover the box back, and a simulated tie means secured exteriorly on said main part.*

*3. The combination of claim 2 wherein said pair of overlapping flaps comprises said end flaps.*

References Cited

The following references, cited by the Examiner, are of record in the patented file of this patent or the original patent.

UNITED STATES PATENTS

| | | | |
|---|---|---|---|
| 3,064,876 | 11/1962 | Warner | 229—87 X |
| 3,273,781 | 9/1966 | Mills | 229—40 |
| 3,368,734 | 2/1968 | Wainberg | 229—87 X |
| 1,174,012 | 2/1916 | Bristol et al. | 229—40 |
| 1,440,233 | 12/1922 | Noel | 229—40 |
| 1,707,680 | 4/1929 | Norwood | 229—40 |
| 1,794,153 | 2/1931 | Creason | 229—40 |
| 1,207,899 | 12/1916 | Greve | 229—87 |
| 1,339,339 | 5/1920 | Hoffman | 229—87 |
| 3,041,775 | 7/1962 | Brown et al. | |
| 3,253,770 | 5/1966 | Black | 229—40 |
| 3,288,353 | 11/1966 | McCullough | 229—87 |

DAVIS T. MOORHEAD, Primary Examiner

U.S. Cl. X.R.

229—33, 40